United States Patent
Gomi et al.

(10) Patent No.: US 7,705,866 B2
(45) Date of Patent: Apr. 27, 2010

(54) IMAGE FORMING APPARATUS WITH AN IMAGE EXPOSURE UNIT LIGHT EMISSION CONTROL FEATURE

(75) Inventors: Fumiteru Gomi, Abiko (JP); Masami Hano, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/035,756

(22) Filed: Feb. 22, 2008

(65) Prior Publication Data

US 2008/0204676 A1 Aug. 28, 2008

(30) Foreign Application Priority Data

Feb. 23, 2007 (JP) ............................. 2007-044767

(51) Int. Cl.
*B41J 2/435* (2006.01)
(52) U.S. Cl. ..................................... 347/228
(58) Field of Classification Search ................. 347/129, 347/228, 236, 237, 240, 246, 247, 251–254; 250/205; 399/235
See application file for complete search history.

(56) References Cited

U.S. PATENT DOCUMENTS 5,153,609 A * 10/1992 Ando et al. .................. 347/129
5,159,184 A * 10/1992 Egawa et al. ................. 250/205
5,619,308 A 4/1997 Kinoshita et al.

FOREIGN PATENT DOCUMENTS

JP 5-323743 A 12/1993
JP 2004-037680 A 2/2004

* cited by examiner

*Primary Examiner*—Hai C Pham
(74) *Attorney, Agent, or Firm*—Fitzpatrick, Cella, Harper & Scinto

(57) ABSTRACT

An image forming apparatus including an image bearing member, a charging unit for charging the image bearing member, and an image exposure unit including a light emitting portion for emitting light to form an electrostatic image. The image forming apparatus also includes a developing unit including a toner carrying member and a bias controlling unit for applying a bias voltage to the toner carrying member, the developing unit being effective to develop the electrostatic image with toner by a potential difference between the toner carrying member and the electrostatic image, a potential difference determining unit, and a storing unit for storing a light amount control value, corresponding to the potential difference, set on a basis of a light emission amount information inherent to the light emitting portion. The image exposure unit reads the light amount control value and controls the light amount based on the light amount control value.

6 Claims, 6 Drawing Sheets

IMAGE FORMING APPARATUS WITH AN IMAGE EXPOSURE UNIT LIGHT EMISSION CONTROL FEATURE

FIELD OF THE INVENTION AND RELATED ART

The present invention relates to an image forming apparatus and an image forming method which use an electrophotographic processes, such as a copying device or a laser beam printer. More particularly, it is related to an image forming apparatus and an image forming method which has means for correcting an exposure amount set point of exposure means for exposing an image bearing member to the light.

Heretofore, the image forming apparatus of the electrophotographic type is ordinarily provided with a photosensitive drum (image bearing member) which has a photosensitive member (photosensitive layer). After a surface of the photosensitive drum is uniformly charged by a primary charging device (process means), an electrostatic latent image is formed by exposing the surface to the image light by an exposure device (process means). In addition, the toner is deposited on the electrostatic latent image by a developing device (process means) so that a toner image is formed.

There is known an image forming apparatus which includes means which changes an exposure amount of the exposure device for carrying out the latent image formation. A conventional image forming apparatus provided with means for controlling the exposure amount involves the following problems.

Referring to FIG. 3, there is shown a relation between a laser power set point (laser output signal value) which is a light emission amount set point (light quantity control set point) for setting a light emission level of a laser scanner as the image exposure means, and a light quantity on the surface of the photosensitive drum. Normally, the light emission amount varies depending on the individual difference among the exposure devices. For this reason, a maximum light quantity on the surface of the photosensitive drum in the FFh level (255th level of 0-255 levels (256 tone gradations)) which is the maximum value of light emission amount set point is adjusted to the predetermined light quantity on the basis of the specifications of the device, at the manufacturing plant, and thereafter, the image forming apparatus is shipped. However, the light emission properties are not constant depending on the individual difference of the exposure device and therefore, as with the laser scanner (2) shown in FIG. 3, for example, the light quantity on the surface of the photosensitive drum may reduce beyond a standard laser scanner (1) with the reduction of the light emission amount set point. The cause of such variation is in the structure of the control circuit of the laser emitting portion. Generally, it is difficult to make the light emission amount uniform in the entire range of the light emission amount set point.

Therefore, even if the light emission amount in a certain light emission level (255 levels, for example) is adjusted to the same level in all the exposure devices, the light emission amounts in the light emission amount set point of another light emission level (128 levels, for example) are not uniform. For this reason, the images of the different densities are outputted correspondingly to the same light emission amount set point.

SUMMARY OF THE INVENTION

Accordingly, the object of the present invention is to provide the image forming apparatus by which a density fluctuation caused by the variation in the individual difference of the light emission amount property of image exposure means, is minimized.

According to an aspect of the present invention, there is provided an image forming apparatus comprising an image bearing member; charging means for charging a surface of said image bearing member; image exposure means for exposing the surface of said image bearing member charged by said charging means to light to form an electrostatic image on the surface of said image bearing member; switching means for switching a light emission level of said image exposure means in accordance with the set point of a light emission amount setting the light emission level of said image exposure means; storing means for storing light emission amount set points set corresponding to different target light emission levels of said image exposure means; light emission amount control means for controlling the light emission level of said image exposure means on the basis of information stored in said storing means; an input portion for inputting information relating to an actual light emission level of said image exposure means corresponding to a predetermined light emission amount set point; and correcting means for correcting the light emission amount set points stored in said storing means on the basis of the information relating to the light emission amounts of said image exposure means corresponding to different light emission amount set points.

These and other objects, features, and advantages of the present invention will become more apparent upon consideration of the following description of the preferred embodiments of the present invention, taken in conjunction with the accompanying drawings.

DESCRIPTION OF THE PREFERRED EMBODIMENTS

The preferred embodiments of the present invention will be described in conjunction with the accompanying drawings.

Embodiment 1

General Arrangement of the Image Forming Apparatus

First, a general arrangement of the image forming apparatus according to the embodiment of the present invention will be described.

Figure 1:
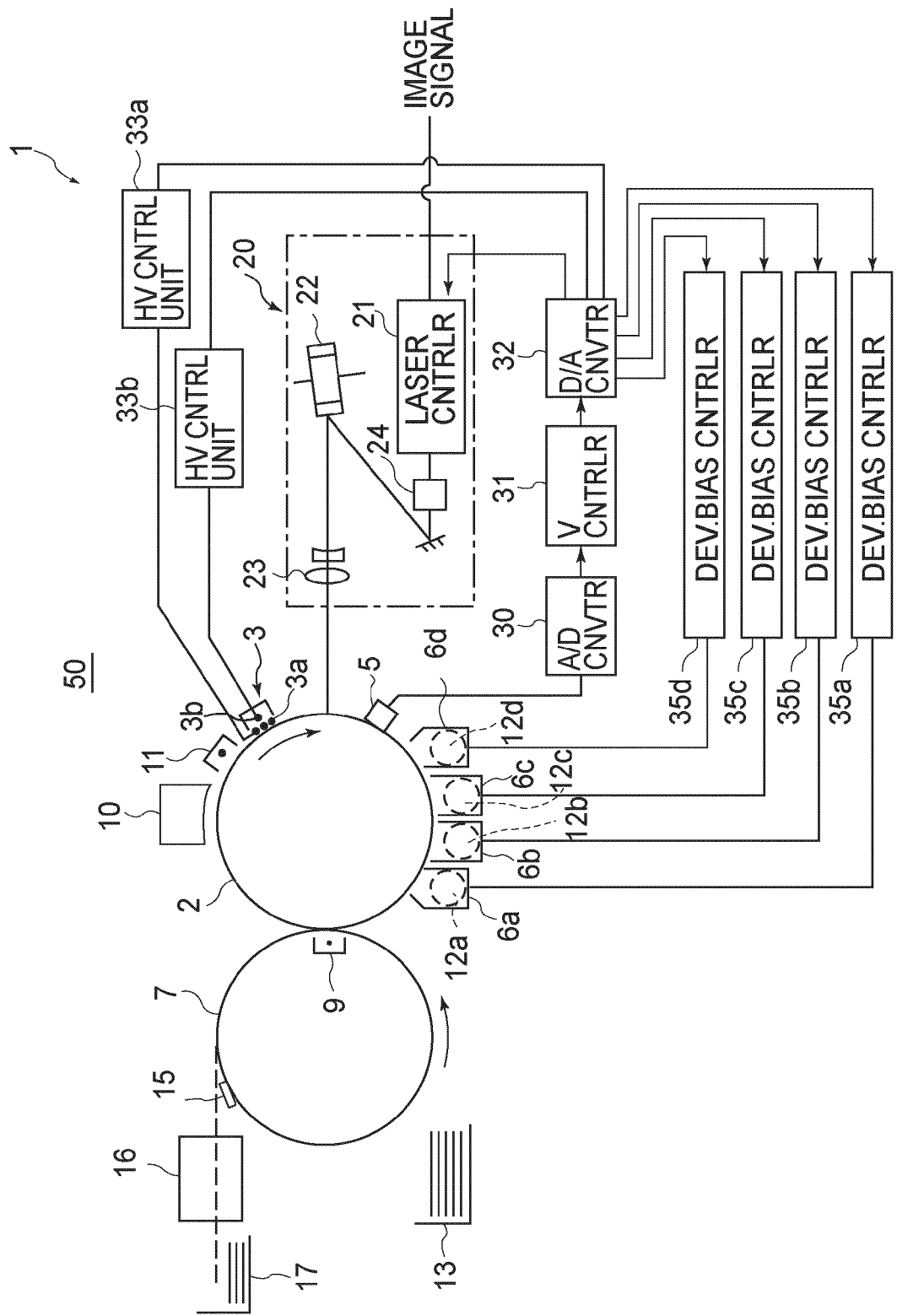
FIG. 1 is a general arrangement of an image forming apparatus according to an embodiment of the present invention.

FIG. 1 is a schematic illustration of the general arrangement of the image forming apparatus according to the embodiment of the present invention. The image forming apparatus 1 of the present embodiment is a copying device of an electrophotographic type.

The image forming apparatus 1 includes an electrophotographic photosensitive member (photosensitive member) (photosensitive drum) 2 of a drum type as an image bearing member. In this embodiment, the charging polarity of the photosensitive drum 2 is negative. In this embodiment, the photosensitive drum 2 is an organic photosensitive member which has photosensitive film of an organic photoconductor (OPC). The photosensitive drum 2 is rotatably supported by the main assembly (apparatus main assembly) 50 of the image forming apparatus 1, and is rotated in the direction of an arrow (clockwise direction) by driving means (unshown).

Following means are disposed around the photosensitive drum 2 in the order named along the rotational direction of the photosensitive drum 2. First, there is provided a primary charging device (corona charger) 3 as charging means (process means) for charging uniformly a surface of the photosensitive drum 2 as a charged body. Next, there is provided a surface potential sensor 5 as surface state detecting means for measuring a surface potential of the photosensitive drum 2. In addition, there are developing devices 6a, 6b, 6c, and 6d as developing means (process means) for depositing the toner of a developer to an electrostatic latent image (electrostatic image) formed on the surface of the photosensitive drum 2, thereby forming a toner image. The developing devices 6a, 6b, 6c, and 6d contain yellow (Y), magenta (M), cyan (C), and black (K) toners, respectively. Next, there is provided a transfer drum 7 as a transfer material carrying member for gripping a transfer material P supplied from a sheet cassette 13. Inside the transfer drum 7, there is provided a transfer electrification device 9 as the transferring means for transferring the toner image formed on the surface of the photosensitive drum 2 onto transfer material P. Moreover, there is provided a cleaning device 10 as cleaning means (process means) for removing residual toner from the surface of the photosensitive drum 2. Next, there is provided a discharging device (corona charger) 11 as discharging means for discharging the surface of the photosensitive drum 2 electrically. In addition, there is a pre-exposure lamp which is the pre-exposure means for exposing the photosensitive drum 2 after the image transfer step and before the primary charging step, as the discharging means.

In this embodiment, the charge potential of the photosensitive member has a negative polarity, and a reverse developing system is employed, as widely known in the field of the electrophotographic image forming apparatus. Therefore, an image scanning system exposes the image portion to the image light, and forms the electrostatic latent image. In the reverse developing system, the charge of the charged photosensitive member attenuates by the exposure. The toner charged to the same polarity as that of charge polarity of the photosensitive member is deposited on this attenuated portion by which the electrostatic latent image is developed. In this specification, for better understanding, the polarity is omitted as for the charge potentials of the photosensitive member and so on and they are expressed in absolute values. The magnitude relation of those values is compared in the absolute value. In the present invention, the charge polarity of the photosensitive member, the exposure type (the image portion exposure or background portion exposure), the development type (the reversal development type or the regular development type), and so on are not restrictive to the present invention.

The primary charging device 3 has a grid electrode 3a and a corona wire 3b, and high voltage controlling units 33a and 33b as bias outputting means are connected with the grid electrode 3a and Corona wire 3b, respectively. A grid bias voltage (image forming condition) VG having the same polarity as the charge polarity of the photosensitive drum 2 is applied to the grid electrode 3a from the high voltage controlling unit 33a. A corona wire supply voltage (image forming condition) is applied from the high voltage controlling unit 33b to Corona wire 3b.

Developing devices 6a, 6b, 6c, and 6d are provided with developing sleeves 12a, 12b, 12c, and 12d for carrying the toner as the developer carrying member, respectively. The developing bias voltage (image forming condition) VDC having the same polarity as the charge polarity of the photosensitive drum 2 is applied to each of developing sleeves 12a, 12b, 12c, and 12d by developing bias voltage control circuits 35a, 35b, 35c, and 35d as bias outputting means, respectively.

A separation claw 15 is contacted to the surface of the transfer drum 7, and the transfer material P after the completion of the image transferring is separated from the transfer drum 7 by the separation claw 15.

The transfer material P separated from the transfer drum 7 is subjected to the toner image fixing operation in a fixing device 16 as fixing means, and is discharged onto a discharging tray 17.

A laser scanner unit (exposure portion) 20 as image exposure means is provided adjacent to the photosensitive drum 2. The laser scanner unit 20 is provided with a laser controlling unit 21 for producing a laser beam modulated correspondingly to the image input signal inputted in a laser source unit (light emitting portion) 24. The laser source unit 24 includes a laser oscillation element. In the laser scanner unit 20, a polygonal mirror 22 which is rotated by driving means (unshown) adjacent to the laser controlling unit 21 and the laser source unit 24 is supported rotatably. The polygonal mirror 22 deflects the laser beam from the laser source unit 24, and scans the surface of the photosensitive drum 2. In the laser scanner unit 20, an image formation lens 23 having the fθ property is provided across the optical path of the laser beam.

The surface potential sensor 5 measures the surface potential of the photosensitive drum 2 at a downstream position of the exposure position on the photosensitive drum 2 by the laser scanner unit 20 (in the present embodiment, it is the upstream of the developing devices 6a-6d). An A/D converter 30 is connected to the surface potential sensor 5. A/D converter 30 converts the analog signal fed from the surface potential sensor 5 to a digital signal, and sends the digital signal to the voltage controller 31 which is control means. The voltage controller 31 includes memory 200 (FIG. 6), such as RAM and ROM, as storing means of the apparatus main assembly 50, CPU100 (FIG. 6) as processing control means, and so on it carries out processing of a developing bias voltage as will be described hereinafter and so on a D/A converter 32 is connected to the voltage controller 31. The D/A converter 32 carries out the re-conversion of the digital signal from the voltage controller 31 to the analog signal, and feeds the analog signal to the high voltage controlling units 33a and 33b and the developing bias voltage control circuits 35a, 35b, 35c, and 35d. By this, the voltage controller 31 effects the control of the corona wire supply voltage, the grid bias voltage VG, and the developing bias voltage VDC. In this manner, the voltage controller 31 functions as setting means for setting the image forming condition.

The operation is as follows at the time of forming the color image, for example in the image forming apparatus 1 of the above structures. First, the photosensitive drum 2 is uniformly charged by the primary charging device 3. The surface of the charged photosensitive drum 2 is scanned and exposed by the laser beam modulated by the image information of the first color (yellow, for example). By this, an electrostatic latent image corresponding to the image information of the first color is formed on the photosensitive drum 2. The electrostatic latent image is developed into a toner image with the developer by the developing device 6a of the corresponding color (yellow, for example). Subsequently, the toner image formed on the photosensitive drum 2 is transferred onto the transfer material P carried on the transfer drum 7.

The above-described steps of the charging, the exposure, the development, and the transferring are carried out sequentially also about the other colors (for example, the magenta, the cyan, and the black). By this, on the transfer material P on the transfer drum 7, the four color toner images are superimposedly transferred sequentially, by which a multi-toner image is formed.

Thereafter, the transfer material P is separated from the transfer drum 7 by the separation claw 15, and is fed to the fixing device 16. The toner image on the transfer material P is fixed by the heat and the pressure in the fixing device 16, and, thereafter, is discharged to the discharging tray 17.

The toner (untransferred toner) which remains on the photosensitive drum 2 after the transfer process is collected by the cleaning device 10. In addition, after the untransferred toner is removed, the photosensitive drum 2 is discharged by the discharging device 11 and is repeatedly used for the image formation.

The image forming apparatus 1 can also form the image in a desired monochromatic or in multi-colors. In that case, except for the number of the developing devices used differing, the image is formed through the process substantially the same as the above-described process.

Figure 2:
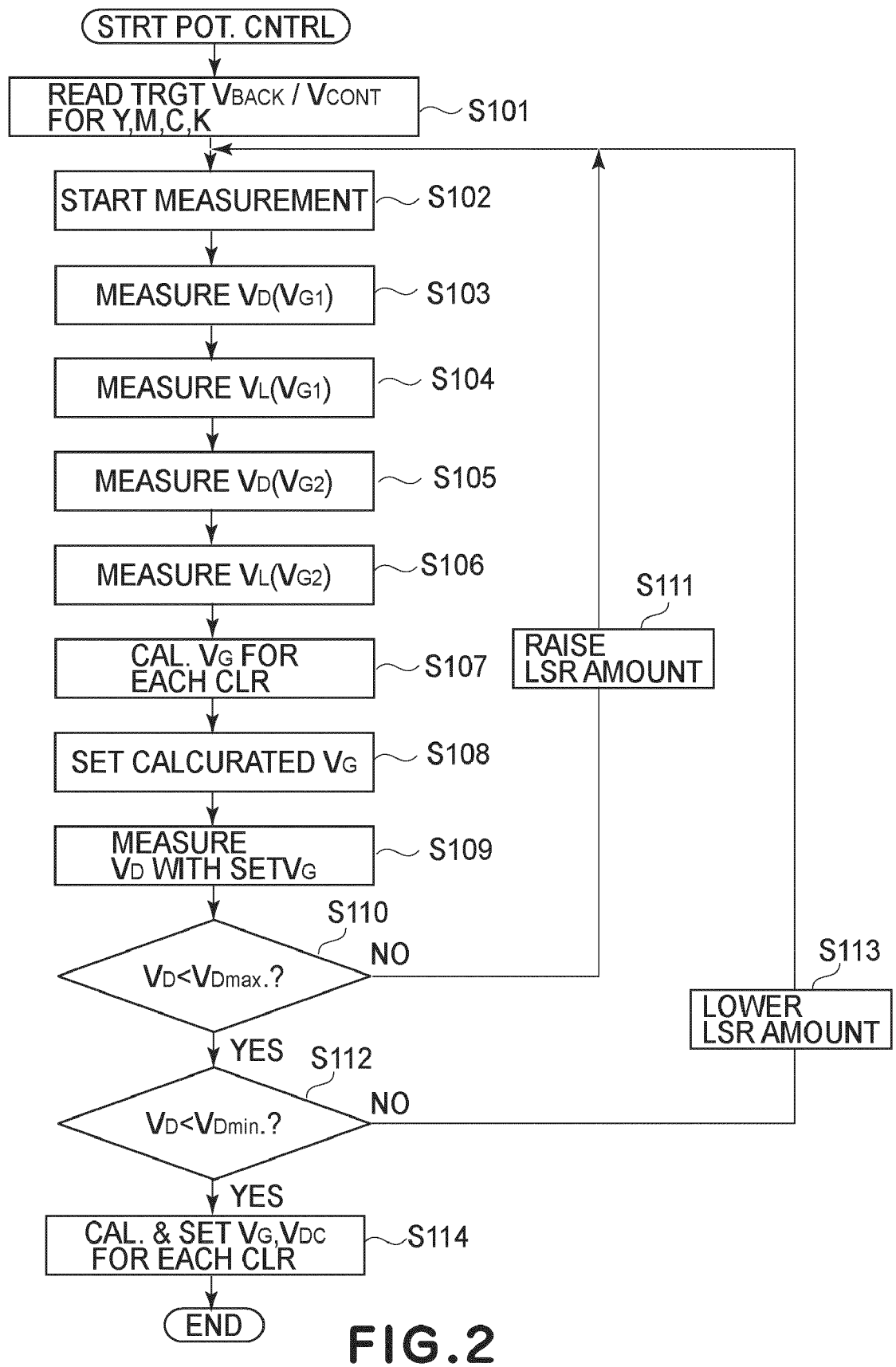
FIG. 2 is a flowchart diagram showing an operation in an example of an image density control (potential control) used in an embodiment of the present invention.
Figure 3:
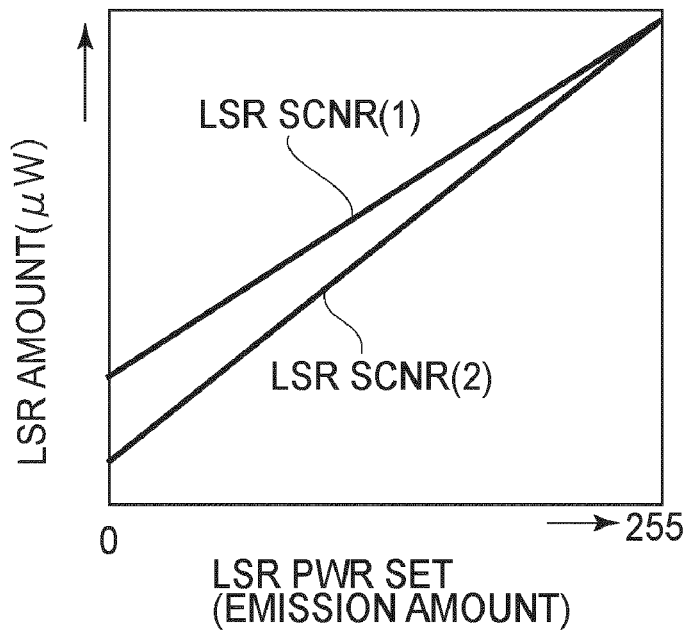
FIG. 3 is a graph for illustrating an individual difference of a light emission amount in a laser scanner unit.

Referring to FIG. 2, the image density control (potential control), the description will be made as to an image density control (potential control) which the voltage controller 31 effects.

When a start signal of the image density control is inputted, the pre-rotation of the photosensitive drum 2 is carried out and the residual potential of the surface of the photosensitive drum 2 is removed by the discharging device 11, simultaneously with the pre-rotation thereof. The voltage controller 31 determines a target potential difference VBACK, a potential difference VCONT, and a light emission amount set point (laser amount) for the each of the four colors on the basis of the data table shown in Table 1 and Table 2 depending on the various image formation parameters, such as the ambient condition, and inputs the determined values (S101), table 1 provides contrast voltage VCONT with which a predetermined maximum density is provided for every ambient condition in response to the development property of each chromatic toner, and these data are beforehand stored in the memory 200 of the voltage controller 31.

Table 2 provides a light emission amount set point of the laser scanner unit 20 corresponding to contrast voltage VCONT, and these data are beforehand stored in the memory 200 of the voltage controller 31. The light emission amount level of the image exposure means is changeable correspondingly to the set point of this light emission amount.

In this embodiment, as an ambient condition detector for sensing the ambient condition of the image forming apparatus 1, an ambient condition sensor (temperature/humidity sensor) 51 (FIG. 6) for sensing the temperature and relative humidity inside and/or around the apparatus main assembly 50 is provided in the apparatus main assembly 50. The output signal of this ambient condition sensor 51 is inputted to the voltage controller 31 through an MD converter 30. And, the voltage controller 31 determines an absolute moisture content as the ambient condition of the image forming apparatus 1 on the basis of the signal inputted from the ambient condition sensor 51.

TABLE 1

| Ambience | Absolute Water Content (g) | Vcont (V) | | | |
|---|---|---|---|---|---|
| | | Y | M | C | K |
| 1 | hum-abs ≦ 1.2 | 280 | 250 | 250 | 220 |
| 2 | 1.2 < hum-abs ≦ 1.56 | 276.2 | 246.4 | 246.4 | 216.8 |
| 3 | 1.56 < hum-abs ≦ 1.94 | 272.4 | 242.8 | 242.8 | 213.6 |
| 4 | 1.94 < hum-abs ≦ 2.33 | 268.6 | 239.2 | 239.2 | 210.4 |
| 5 | 2.33 < hum-abs ≦ 2.72 | 264.8 | 235.6 | 235.6 | 207.2 |
| 6 | 2.72 < hum-abs ≦ 3.13 | 261 | 232 | 232 | 204 |
| 7 | 3.13 < hum-abs ≦ 3.54 | 257.2 | 228.4 | 228.4 | 200.8 |
| 8 | 3.54 < hum-abs ≦ 3.97 | 253.4 | 224.8 | 224.8 | 197.6 |
| 9 | 3.97 < hum-abs ≦ 4.42 | 249.6 | 221.2 | 221.2 | 194.4 |
| 10 | 4.42 < hum-abs ≦ 4.88 | 245.8 | 217.6 | 217.6 | 191.2 |
| 11 | 4.88 < hum-abs ≦ 5.37 | 242 | 214 | 214 | 188 |
| 12 | 5.37 < hum-abs ≦ 5.87 | 238.2 | 210.4 | 210.4 | 184.8 |
| 13 | 5.87 < hum-abs ≦ 6.39 | 234.4 | 206.8 | 206.8 | 181.6 |
| 14 | 6.39 < hum-abs ≦ 6.94 | 230.6 | 203.2 | 203.2 | 178.4 |
| 15 | 6.94 < hum-abs ≦ 7.51 | 226.8 | 199.6 | 199.6 | 175.2 |
| 16 | 7.51 < hum-abs ≦ 8.12 | 223 | 196 | 196 | 172 |
| 17 | 8.12 < hum-abs ≦ 8.74 | 219.2 | 192.4 | 192.4 | 168.8 |
| 18 | 8.74 < hum-abs ≦ 9.4 | 215.4 | 188.8 | 188.8 | 165.6 |
| 19 | 9.4 < hum-abs ≦ 10.09 | 211.6 | 185.2 | 185.2 | 162.4 |
| 20 | 10.09 < hum-abs ≦ 10.82 | 207.8 | 181.6 | 181.6 | 159.2 |
| 21 | 10.82 < hum-abs ≦ 11.58 | 204 | 178 | 178 | 156 |
| 22 | 11.58 < hum-abs ≦ 12.38 | 200.2 | 174.4 | 174.4 | 152.8 |
| 23 | 12.38 < hum-abs ≦ 13.21 | 196.4 | 170.8 | 170.8 | 149.6 |
| 24 | 13.21 < hum-abs ≦ 14.09 | 192.6 | 167.2 | 167.2 | 146.4 |
| 25 | 14.09 < hum-abs ≦ 15 | 188.8 | 163.6 | 163.6 | 143.2 |
| 26 | 15 < hum-abs ≦ 15.96 | 185 | 160 | 160 | 140 |
| 27 | 15.96 < hum-abs ≦ 16.97 | 181.2 | 156.4 | 156.4 | 136.8 |
| 28 | 16.97 < hum-abs ≦ 18.02 | 177.4 | 152.8 | 152.8 | 133.6 |
| 29 | 18.02 < hum-abs ≦ 19.12 | 173.6 | 149.2 | 149.2 | 130.4 |
| 30 | 19.12 < hum-abs ≦ 20.27 | 169.8 | 145.6 | 145.6 | 127.2 |
| 31 | 20.27 < hum-abs ≦ 21.6 | 166 | 142 | 142 | 124 |
| 32 | 21.6 < hum-abs | 162.2 | 138.4 | 138.4 | 120.8 |

TABLE 2

| Vcont (V) | Set points of emission amount (Max. 255) |
|---|---|
| 280 | 252 |
| 275 | 248 |
| 270 | 244 |
| 265 | 240 |
| 260 | 236 |
| 255 | 232 |
| 250 | 228 |
| 245 | 224 |
| 240 | 220 |
| 235 | 216 |
| 230 | 212 |
| 225 | 208 |
| 220 | 204 |
| 215 | 200 |
| 210 | 196 |
| 205 | 192 |

TABLE 2-continued

| Vcont (V) | Set points of emission amount (Max. 255) |
|---|---|
| 200 | 188 |
| 195 | 184 |
| 190 | 180 |
| 185 | 176 |
| 180 | 172 |
| 175 | 168 |
| 170 | 164 |
| 165 | 160 |
| 160 | 156 |
| 155 | 152 |
| 150 | 148 |
| 145 | 144 |
| 140 | 140 |
| 135 | 136 |
| 130 | 132 |
| 125 | 128 |
| 120 | 124 |

Figure 8:
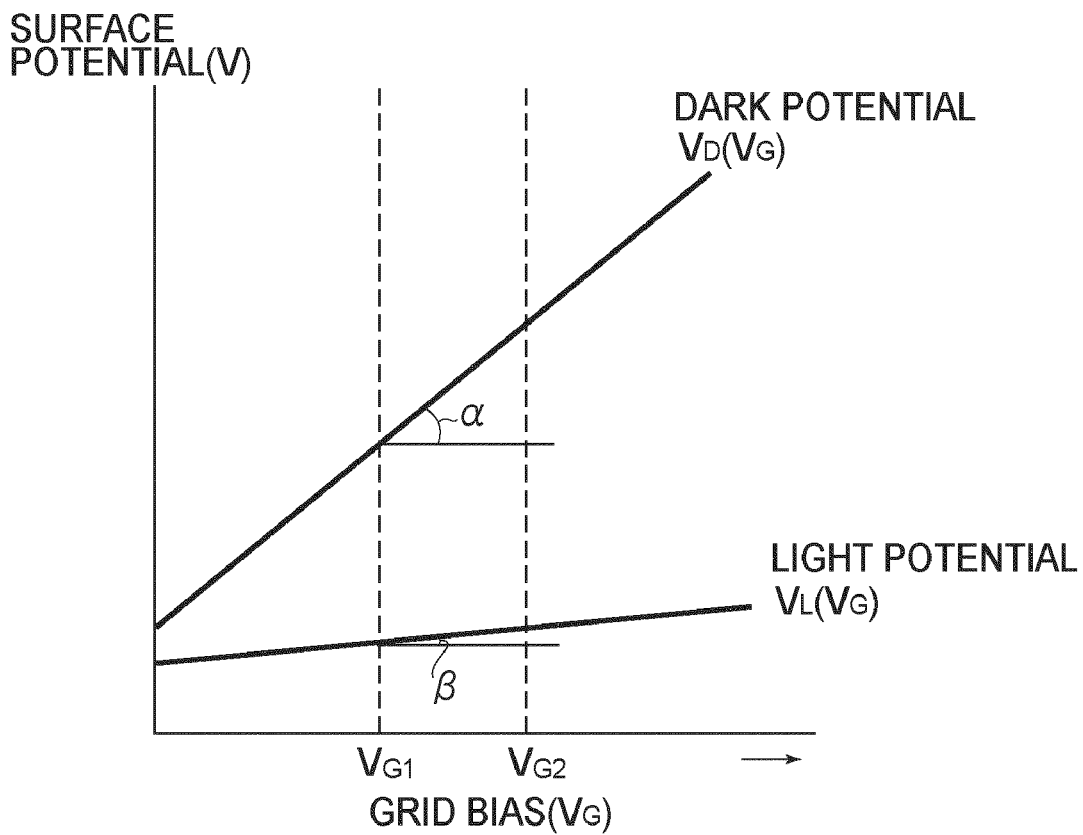
FIG. 8 is a graph showing an approximation property of an electrical change for determining a grid bias voltage.

Then, required contrast voltage VCONT under the ambient condition is calculated. Next, by measuring light portion potential and dark portion potential under the different grid bias voltages applied to the primary charging device, an electrical change property as shown in FIG. 8 is determined. In FIG. 8, the abscissa represents the grid bias voltage applied to the primary charging device and the ordinate represents the surface potential of the photosensitive drum. In FIG. 8, VD (VG) depicts a dark portion electrical change property in the case of changing the grid bias voltage, and VL (VG) depicts a light portion electrical change property in the case of changing the grid bias voltage. The exposure amount of the image exposure means is set so that it is fixed to the value used as the reference corresponding to a required contrast voltage VCONT under the ambient condition, and then, the required grid bias voltage corresponding to contrast voltage VCONT under the ambient condition is determined from the electrical change property.

The setting method of the grid bias voltage in the present embodiment will be described concretely.

The surface of the photosensitive drum 2 is charged by the primary charging device 3 in the state where the grid bias voltage VG1 determined beforehand is applied to the grid electrode 3a. And, the dark portion potential VD (VG1) in the state where the exposure by the laser scanner unit 20 is not carried out, and the light portion potential VL (VG1) in the state where the exposure by the laser scanner unit 20 is carried out are measured. These measurement results are converted to digital signals with A/D converter 30, and are inputted to the voltage controller 31. Then, the measurement is similarly carried out also about VG2 determined beforehand. More particularly, the dark portion potential VD (VG2) in the state where the exposure by the laser scanner unit 20 is not carried out, and the light portion potential VL (VG2) in the state where the exposure by the laser scanner unit 20 is carried out are measured. These measurement results are converted to digital signals with A/D converter 30, and are inputted to the voltage controller 31 (S102-S106).

Then, as shown in FIG. 8, in the voltage controller 31, from the dark portion potential VD (VG1), VD (VG2) and the light portion potential VL (VG1), and VL (VG2) which are provided as mentioned above, respective inclinations α and β are determined using following formulas (1) and (2), and they are stored in the memory 200, $$\alpha = VD(VG1) - VD(VG2)/(VG2 - VG1) \quad (1)$$

$$\beta = VL(VG1) - VL(VG2)/(VG2 - VG1) \quad (2)$$

In addition, the voltage controller 31 determines the electrical change property of the photosensitive drum 2 by linear approximation from the values of α and β, and the dark portion potential VD (VG1), VD (VG2) and the light portion potential VL (VG1) and VL (VG2). The electrical potential change property by this linear approximation, more particularly, the dark portion electrical potential change property VD (VG) and the light portion electrical potential change property VL (VG) are determined by following formulas (3) and (4).

$$VD(VG) = \alpha(VG - VG1) + VD(VG1) \quad (3)$$

$$VL(VG) = \beta(VG - VG1) + VL(VG1) \quad (4)$$

Figure 7:
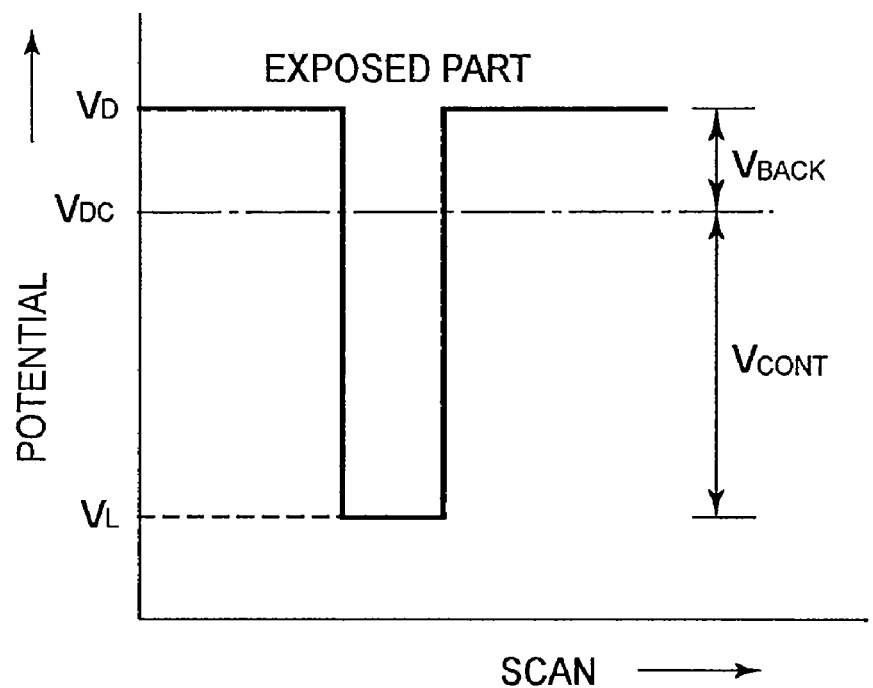
FIG. 7 is a schematic illustration which illustrates a relationship among a light portion potential ($V_L$), a dark portion potential ($V_D$), and a developing bias voltage ($V_{DC}$).

Then, the voltage controller 31 determines the grid bias voltage VG corresponding to the sum of the target potential difference VBACK and contrast voltage VCONT from the above-described formula (3) and (4). More particularly, following formulas (5) and (6) hold in view of the relation shown in FIG. 7, $$VD - VL = VBACK + VCONT \quad (5)$$

$$VDC = VL + VCONT \quad (6)$$

From the relation of the above-described formulas (3) and (4), $$VG = VD(VG) - VL(VG) - (VD(VG1) - VL(VG1))/(\alpha - \beta) + VG1$$

In addition, the VG is as follows from the above-described formula (5):

$$VG = VBACK + VCONT - (VD(VG1) - VL(VG1))/(\alpha - \beta) + VG1 \quad (7)$$

Since all the values in the formula (7) are known, it is determined uniquely. Moreover, the voltage controller 31 determines the light portion potential VL, the dark portion potential VD, and the developing bias voltage VDC from the above-described formulas (3), (4), and (6). The light portion potential VL, the dark portion potential VD, and the developing bias voltage VDC are stored in the memory 200 of the voltage controller 31 in response to the switching of the target potential difference VBACK and the potential difference VCONT.

The processing of the grid bias voltage VG, the developing bias voltage VDC, and so on is carried out for every color, and the data for all the colors are stored (S107-S109). The preparation of image formation completes at the time of the end of storing of the data for all the colors. However, when the light emission amount of the laser scanner unit 20 deviates from a standard value, it may be required to repeat the above-described control.

More particularly, as will be described hereinafter, the charge potential of the photosensitive drum 2 has a desired range. In other words, the charge potential of the photosensitive drum 2 has an upper limit and a lower limit.

If the dark portion potentials VD for all the colors stored as mentioned above fall within the range between the upper limit and the lower limit of the charge potential of the photosensitive drum 2, the control will be finished then.

On the other hand, when the dark portion potential VD for a certain color stored as mentioned above is beyond the upper limit of the charge potential of the photosensitive drum 2, the light emission amount set point for the color thereof is increased to increase the laser amount (laser drive current). And then, a flow of a similar sequential operation is carried out (S110, S111). On the other hand, with the dark portion potential VD for a certain color stored as mentioned above is smaller than the lower limit of the charge potential of the photosensitive drum 2, the light emission amount set point about the color thereof is reduced to reduce the laser amount. And then, a flow of a similar sequential operation is carried out (S112, S113). In this manner, when the control is repeatedly carried out and the charge potentials for all the colors are finally settled in the desired range, the grid bias set point VG, the developing bias VDC, and so on for each color are stored in the memory 200 of the voltage controller 31, and the control is finished (S114).

When the image is formed after the end of the above preparation of image formation, the voltage controller 31 reads grid bias voltage VG and the developing bias voltage VDC from the memory 200 for each color, and feeds the signals to the high voltage controlling units 33a and 33b and the developing bias voltage control circuits 35a-35d. By this, The high voltage controlling units 33a and 33b and the developing bias voltage control circuits 35a-35d apply the grid bias voltage VG and the developing bias voltage VDC which are designated. In this state, the toner image of the first color is formed on the photosensitive drum 2 and the formed toner image is transferred onto transfer material P. And, similar operation is carried out for each of the other colors. Here, the grid bias voltages VG and the developing bias voltages VDC are different depending on the respective colors. And, it is discriminated whether the four color image formations have finished, and if the result of the discrimination is affirmative, the image forming operation is finished.

Here, a description will be made as to VG1 and VG2 which are determined beforehand. In the above-described processing, it is the premise that the charging and the exposure properties of the photosensitive member corresponding to VG can be approximated in a straight line based on VD (VG1), VD (VG2), VL (VG1), and VL (VG2). However, it is sometimes actually not linear. For this reason, when VG1 and VG2 greatly differ from a VG value which should be set, there is a difference between VD corresponding to calculated VG and the actual value of VD. For this reason, in this embodiment, the set region of the charge potential is taken into the consideration, and VG1=400V and VG2=700V.

Charge potential: next, the target charge potential of the photosensitive member will be described. The charge potential of the photosensitive member may need to be within the limits of the region in which the photosensitive member memory (drum memory) (the phenomenon in which the potential hysteresis on the photosensitive member remains) does not produce. In the structure of the present embodiment, when the charge potential is relatively low, the so-called image exposure ghost image with which the potential hysteresis of the electrostatic latent image of the precedent image appears on the subsequent images produces.

It is thought that this phenomenon is attributable to the fact that a potential difference exists between the image-exposed portion and the non-exposure portion on the photosensitive member in the remaining amount level of the carrier produced by the pre-exposure at the time of going into the charging step after passing the primary transfer portion. For this reason, the production of the ghost image will be suppressed when the potential contrast between the image-exposed portion and the non-exposure portion is small. Therefore, for the solution of this problem, it is effective to set the charge potential at the high level.

Moreover, it is thought that this phenomenon relates to the travelling property of the carrier of the photosensitive member, and it is confirmed that the production levels thereof differ depending on the ambient condition.

The following table 3 provides the upper and lower limit values of the target charge potential set correspondingly to the ambient condition, in this embodiment.

TABLE 3

| | | Charged potential (V) | | | | | | |
|---|---|---|---|---|---|---|---|---|
| | Water | 0-25 k | | 25-50 k | | 50-75 k | | 75-100 k | |
| Amb. | content | UL. | LL. | UL. | LL. | UL. | LL. | UL. | LL. |
| 1 | 0.86 | 750 | 675 | 780 | 705 | 810 | 735 | 840 | 765 |
| 2 | 1.73 | 725 | 650 | 755 | 680 | 785 | 710 | 815 | 740 |
| 3 | 5.8 | 700 | 625 | 730 | 655 | 760 | 685 | 790 | 715 |
| 4 | 8.9 | 675 | 600 | 705 | 630 | 735 | 660 | 765 | 690 |
| 5 | 15 | 650 | 575 | 680 | 605 | 710 | 635 | 740 | 665 |
| 6 | 18 | 625 | 550 | 655 | 580 | 685 | 610 | 715 | 640 |
| 7 | 21.6 | 600 | 525 | 630 | 555 | 660 | 585 | 690 | 615 |

The absolute moisture content from the low humidity ambient condition to the high temperature and high humidity ambience are shown in the seven steps in Table 3. However, the voltage controller 31 can calculate the upper and lower limits of the charge potential also for the ambient condition between the adjacent ambient conditions given in the table by carrying out the linear interpolation correspondingly to the result of detection of the ambient condition sensor 51.

With the structure of this embodiment, the ghost is produced when a charge potential is lower than the lower limit value of Table 3.

The image forming apparatus 1 of the present embodiment is provided with a counter for recording the number of image formations (or sheet processing number). And, the target charge potential is changed correspondingly to the number of image formations. The reason thereof is as follows.

First, about the lower limit of the charge potential, since the travelling property of the carrier of the photosensitive member changes with the usage, the permissible levels of the charge potential differ correspondingly to the change thereof. As for the target charge potential, it is preferably as wide as possible. This is because, the number of the repeated controls in the potential control can be minimized. The image productivity (number of image formations per unit time) of the image forming apparatus 1 can be increased.

On the other hand, the upper limit of the charge potential is the charge potential of the photosensitive member provided at the time of 900V which is the upper limit value for setting the grid bias voltage VG. With the present embodiment, an organic photosensitive member is used and it has the tendency which the exposure sensitivity reduces with usage and therefore, the charge potential is made to rise in order that the exposure amount according to the laser scanner unit 20 assures contrast voltage VCONT required in the constant case. However, when the upper limit of the charge potential is reached, it is necessary to increase the exposure amount by the laser scanner unit 20.

Laser scanner unit: FIG. 2 shows a flow wherein, when the estimate of VD exceeds the upper limit of the charge potential, the laser amount is increased by the predetermined amount, and when the calculated value of VD is smaller than the lower limit of the charge potential, the laser amount is weakened by the predetermined amount, and the measurement for potential control is carried out again. As has been described hereinbefore, when the set point of the light emission amount corresponding to required contrast voltage VCONT is fixed at the value corresponding to the standard laser scanner unit 20, the number of repeated controls in the case that the laser scanner units 20 having the different light emission amount properties are provided is large.

Figure 4:
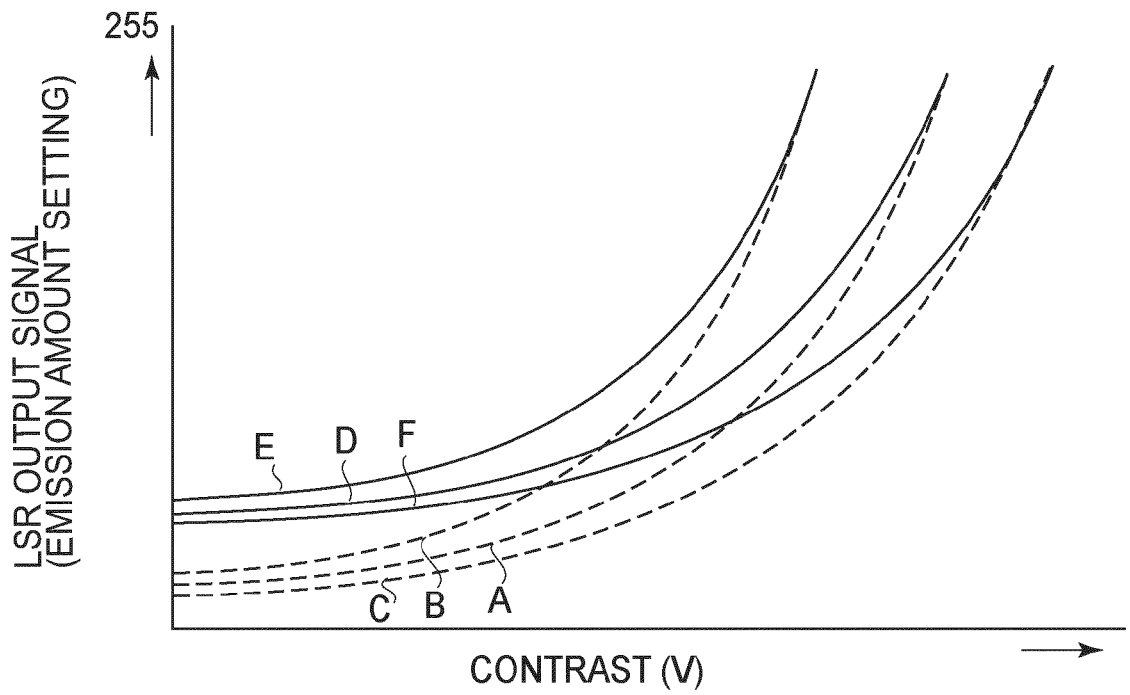
FIG. 4 is a graph showing a relation among a contrast voltage, a light emission amount set point, and a charge potential in the case where two laser scanner units having different properties is used.

Moreover, when the ambient condition changes a lot, the responsivity deteriorates. FIG. 4 shows the relation between the set point of the light emission amount, and the charge potential corresponding to required contrast voltage VCONT under the ambient condition. A line A in FIG. 4 shows the standard in the case of using the laser scanner (1), and the charge potential is 700V in any ambient condition. In other words, in the determination of required contrast voltage VCONT, the charge potential will be set to 700V when the set point of the light emission amount corresponding thereto is determined on this line. Moreover, lines B and C in FIG. 4 are the lines with which the charge potentials are 600V and 800V, respectively, at the time of using the laser scanner (1).

From this, when the light quantity is small, in order to adjust the charge potential at 700V, in the same contrast voltage VCONT, it is necessary that the light emission amount set point is larger than Line A. Moreover, lines E and F in FIG. 4 are the lines with which the charge potentials are 600V and 800V, in the case of using the laser scanner (2) similarly, respectively.

Figure 5:
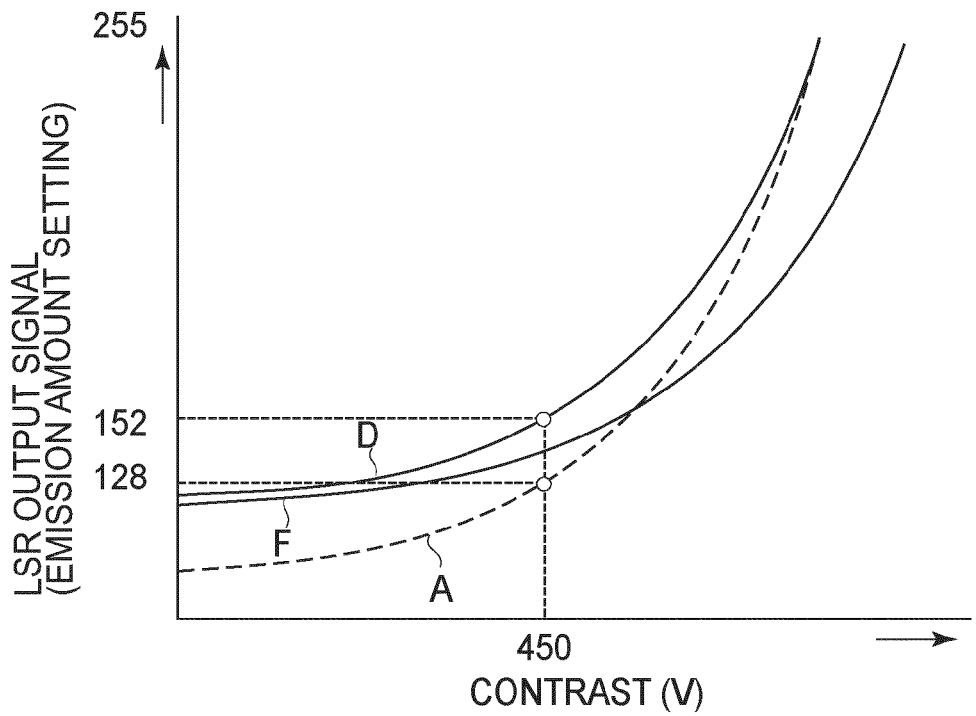
FIG. 5 is a graph showing the relation among a contrast voltage, a light emission amount set point, and a charge potential in the case where two laser scanner units having the different property are used.

For this reason, at the time of determining the light emission amount set point depending on the standard table value in spite of provision of the laser scanner (2) in the apparatus main assembly, the following may occur. For example, in FIG. 5 showing the similar relation as in FIG. 4, according to the standard table value (line A), the set point of the light emission amount is at 128 level when the contrast voltage VCONT is 450V. However, since the light quantity of the laser scanner (2) is small, the charge potential exceeds 800V with this light emission amount set point. At the time of using the laser scanner unit (2), if the light emission amount set point is not at the 152 level, the charge potential cannot be actually set to 700V. For this reason, even in the case of raising the set point of the light emission amount by increments of 6, six repeated controls are required, by the time the charge potential is set to 700V. Moreover, if the changing amount of one control is increased, it is possible to reduce the number of times of the repeated control. However, when the difference between the target laser power and the laser power before the adjustment is small, there arises a problem that the change of the one repeated control is too large and the adjustment is impossible for the optimal value.

Although the conventional problem to be solved has been described using an example of the image forming condition setting method, the other control method also involves the similar problem to be solved as for the method for carrying out variable control of the exposure amount by the image exposure means.

One of the effects of the present embodiment is that the setting and control of the image forming condition can be carried out in a short time irrespective of the individual difference of the light emission amount property of the laser scanner unit 20. Moreover, another aspect of the present embodiment is that the setting and control of the image forming condition can be carried out in a short time, without using the special detecting means for sensing the light emission amount of the laser scanner unit 20 in the apparatus main assembly 50.

In this embodiment, the data table is changed, taking the property of laser scanner unit 20 itself into consideration. More particularly, in this embodiment, the image forming apparatus 1 includes the laser scanner unit 20 which can change the light emission level on the basis of the light emission amount set point and which exposes the charged photosensitive drum 2 to the image light to form the electrostatic image on the photosensitive drum 2. Moreover, it includes the setting means for setting the image forming condition so that the contrast voltage which is the potential difference between electrostatic image and developing device 6 on the photosensitive drum 2 at the time of exposing the photosensitive drum 2 with the set point of the light emission amount set correspondingly to the target image forming condition is the target value. In addition, in this embodiment, the image forming apparatus 1 includes the correcting means for correcting the light emission amount set point set correspondingly to the target image forming condition on the basis of the relation of the actual exposure amount of the laser scanner unit 20 corresponding to the light emission amount set point.

More specifically, the individual difference of the light emission amount of the laser scanner unit 20 is recognized by the apparatus main assembly 50 side, and the data table for the setting of the image forming condition and the control (image adjustment control) is corrected on the basis of the result thereof. More particularly, in this embodiment, the laser scanner unit 20 includes readable and writable storing means, and the light emission amount information on the individual laser scanner unit 20 is written in this storing means. And, the apparatus main assembly 50 reads the light emission amount information in the storing means thereof, and it is made to reflect in the setting and control of the image forming condition (image adjustment control) for carrying out variable control of the exposure amount by the laser scanner unit 20. By this, quick setting and control of the high precision image forming condition can be accomplished. Hereinafter, a more detailed description will be made.

Figure 6:
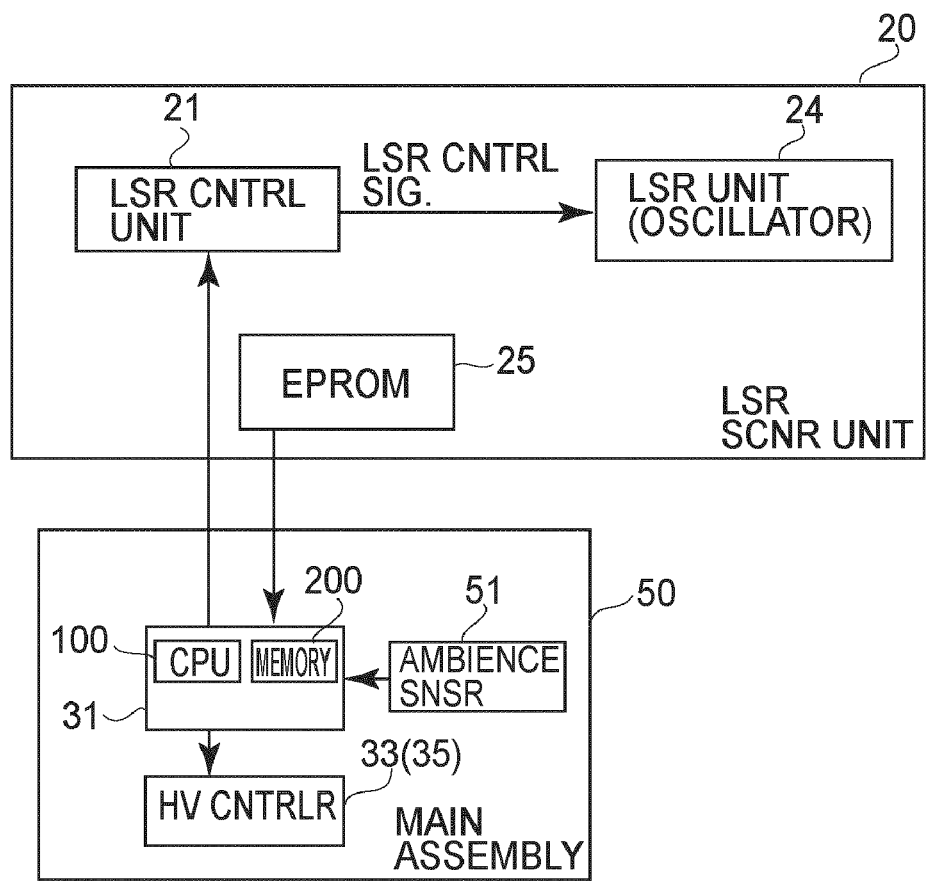
FIG. 6 is a block diagram showing a control manner according to an embodiment of the present invention.

FIG. 6 is a schematic block diagram showing the relation between the apparatus main assembly 50 of the image forming apparatus 1, and the laser scanner unit 20 provided in the apparatus main assembly 50, according to the present embodiment.

In this embodiment, the inside of the laser scanner unit 20 is provided with the memory element (hereinafter "EPROM") 25 as a readable and writable storing means. The light emission amount information inherent to the laser scanner unit 20 is beforehand stored in the EPROM25.

In the state where the laser scanner unit 20 is mounted to the apparatus main assembly 50, the EPROM25 is communicatably connected with the voltage controller 31 which is the control means. This connection may be of a wire type or a wireless type.

In addition, typically, this light emission amount information is stored in EPROM25 with a predetermined tool at the following timings. It is carried out, at the time of the inspection steps in assembly operation of the laser scanner unit 20 at the time of the installation, to the apparatus main assembly 50, of the assembled laser scanner unit 20, or at the time of the factory shipments of the image forming apparatus 1 with which the laser scanner unit 20 is mounted to the apparatus main assembly 50 and so on.

Figure 9:
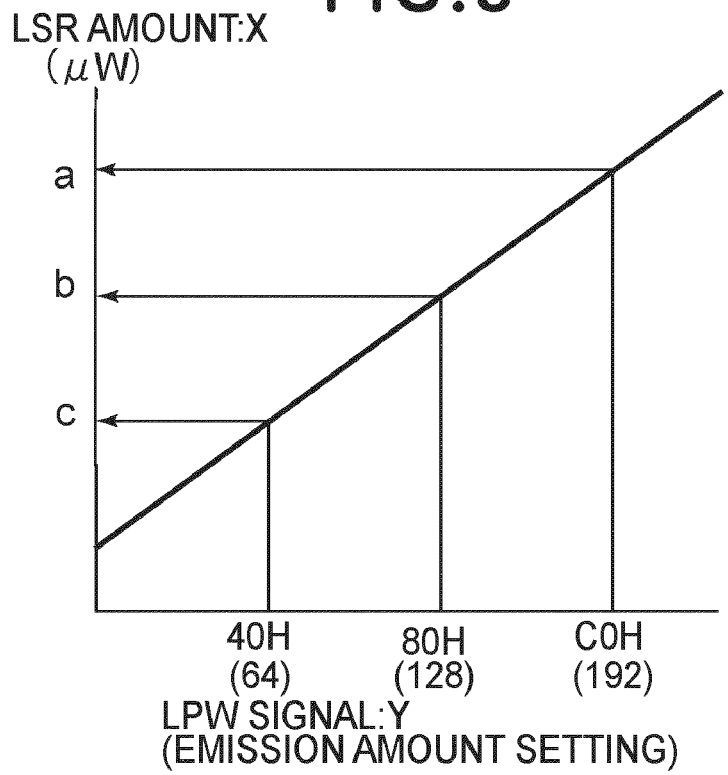
FIG. 9 is a graph for illustrating a content of light emission amount information according to an embodiment of the present invention.

FIG. 9 is a diagram illustrating the method for reflecting the light emission amount information stored in EPROM25 in the control table, in this embodiment.

In this embodiment, among the light emission amount set points (LPW signal values) of 0-255 levels (256 tone gradations), the light quantities of two points at the 64 (40 h) level and 192 (C0h) level are measured beforehand, and are stored in the EPROM25 with the light emission amount set points thereof. More particularly, the light emission amount information is the information which indicates the actual light emission amount (exposure amount) corresponding to the light emission amount set point for designating the light emission level. In this embodiment, the relations of the light quantities and the light emission amount set points at the two points are stored in the EPROM25 as the light emission amount information The relations between the set points of the light quantities and the light emission amounts may be stored about more points.

On the other hand, as shown in the following Table 4, the data table (light quantity table) showing an optimal laser amount corresponding to required contrast voltage VCONT in each ambient condition is stored in the storing means in the apparatus main assembly 50 side (the present embodiment, it is the memory 200 of the voltage controller 31).

TABLE 4

| Contrast (V) | Light amount (microwatt) |
|---|---|
| 0 | 20 |
| 80 | 30 |
| 120 | 40 |
| 160 | 50 |
| 200 | 60 |
| 240 | 70 |
| 280 | 80 |
| 320 | 90 |
| 360 | 100 |
| 400 | 110 |
| 440 | 120 |
| 480 | 130 |
| 520 | 140 |
| 560 | 150 |
| 600 | 160 |
| 640 | 170 |
| 680 | 180 |

In this embodiment, first, in the image density control (potential control) described above, the ambient condition of the apparatus main assembly 50 is sensed by the ambient condition sensor 51. Subsequently, the CPU100 of the voltage controller 31 fetches and sets the optimal laser amount under the ambient condition sensed on the basis of the light quantity table (Table 4) stored in the memory 200 of the voltage controller 31. Subsequently, the laser controlling unit 21 of the voltage controller 31 controls the laser source unit 24, and it determines the set point of the light emission amount which provides the current supply for providing the thus set optimal laser amount, and, thereafter, feeds it to the laser controlling unit 21. The specific calculation method of the light emission amount set point is as follows.

The relation between light quantity X (microwatt) and the light emission amount set point Y is expressed by the following formula (8) as a result of the linear approximation.

$$Y = \gamma X + \delta \quad (8)$$

The light emission amount information (X, Y)=(c, 64), (a, 192) stored in EPROM25 of the laser scanner unit 20 is substituted in the above-described formula (8). Then, the following formulas (9) and (10) result:

$$64 = \gamma c + \delta \quad (9)$$

$$192 = \gamma a + \delta \quad (10)$$

γ and δ inherent to the laser scanner unit 20 are determined from the above-described formula (9) and (10). By this, it is possible to determine the light emission amount set point Y corresponding to given laser amount X.

For this reason, when the required contrast voltage VCONT under the ambient condition is determined, the light quantity X corresponding to the contrast voltage VCONT is read from the light quantity table (Table 4) stored in the memory 200 of the voltage controller 31, and the light emission amount set point Y is calculated. By this, the light emission amount set point inherent to this laser scanner unit 20 corresponding to this contrast voltage VCONT can be determined.

In this manner, the light quantity table stored in the apparatus main assembly 50 side is corrected (changed) on the basis of the light emission amount information inherent to the laser scanner unit 20 stored in EPROM25 of the laser scanner unit 20. By this, the light emission amount property inherent to the laser scanner unit 20 can be reflected in the image density control (potential control).

In this embodiment, the apparatus main assembly 50 includes the voltage controller 31 which functions as the setting means for setting the image forming condition using the light emission amount information read from EPROM25. Here, the voltage controller 31 sets the image forming condition correspondingly to the ambient condition of the apparatus main assembly 50. In more detail, in order to adjust the contrast voltage at the target value set correspondingly to the ambient condition of the apparatus main assembly 50, the voltage controller 31 carries out the following control. It carries out the variable control of at least one of the charge potential of the photosensitive drum 2 by the primary charging device 3, the exposure amount of the photosensitive drum 2 by the laser scanner unit 20, and the bias voltages applied to the developing devices 6a-6d. The contrast voltage is the potential difference between the electrostatic image on the photosensitive drum 2 and the developing devices 6a-6d. Particularly, in this embodiment, the voltage controller 31 has the set point of the exposure amount of the photosensitive drum 2 by the laser scanner unit 20 corresponding to the target value of the contrast voltage set correspondingly to the ambient condition of the apparatus main assembly 50. And, the voltage controller 31 for functioning as the correcting means for correcting the set point of the exposure amount (conversion) converts the set point of the exposure amount on the basis of the light emission amount information read from the EPROM25.

In this manner, the image forming method according to the present embodiment includes a step of charging the photosensitive drum 2 by the primary charging device 3, and a step of forming the electrostatic image on the photosensitive drum 2 by exposing the charged photosensitive drum 2 by the laser scanner unit 20. The image forming method further includes a step of developing, with the developer, the electrostatic image formed on the photosensitive drum 2 by the developing device 6, and a step of controlling the image forming condition by exposing with the light emission amount set point corresponding to the target image forming condition. And, in this embodiment, the image forming method further includes the step of sensing the actual exposure amount of the laser scanner unit 20 corresponding to light emission amount set point, and the step of changing the light emission amount set point corresponding to the target image forming condition on the basis of this result of detection. Particularly, in this embodiment, this actual exposure amount is sensed on the basis of the information stored in the EPROM25.

In the above-described example, the light emission amount set point has been calculated on the basis of the light emission amount information stored in the laser scanner unit 20 side each time the laser amount corresponding to required contrast voltage VCONT is determined from the light quantity table stored in the apparatus main assembly 50. However, the present invention is not limited to this type. For example, the data table indicating the light emission amount set point corresponding to the required contrast voltage VCONT in each ambient condition inherent to this laser scanner unit 20 may be produced on the basis of the light emission amount information stored in the laser scanner unit 20 side. And, this data table can be stored in the storing means of the apparatus main assembly 50. The light emission amount set point in this data table is determined as follows. For example, the light emission amount set point inherent to the laser scanner unit 20 is calculated from the light quantity data at 2 points read from the EPROM25 of the laser scanner unit 20, and the calculation result is written in. Also in this manner, similarly to the above, The light quantity table stored in the apparatus main assembly 50 is corrected (changed) on the basis of the light emission amount information inherent to this laser scanner unit 20 stored in EPROM25 of the laser scanner unit 20, and then, it is used. By this, the light emission amount property inherent to the laser scanner unit 20 can be reflected in the image density control (potential control).

The process for increasing and decreasing the laser amount by the predetermined amount (S111, S113) is included in the control flow of FIG. 2. As for the predetermined amount of the change in the laser amount at this time, it is preferable that the values corresponding to the required contrast voltage VCONT under the ambient condition are determined, respectively on the basis of the light emission amount properties of the laser scanner unit 20 as shown in FIG. 4. For this reason, the convergence property of the control can further be enhanced by this predetermined changing amount being changed on the basis of each light emission amount information stored in the EPROM25 of the laser scanner unit 20. For example, this predetermined amount is stored in the memory 200 of the voltage controller 31 of the apparatus main assembly 50 as a light quantity value. And, the amount of increase and decrease of the light emission amount set point required for the light quantity change correspondingly to the light quantity value can be determined from light emission amount information indicative of the relation between the above-mentioned light quantities at the two points and the light emission amount set points stored in the EPROM25 of the laser scanner unit 20.

In this manner, heretofore, when there is variation in the property inherent to the laser scanner unit provided in the apparatus main assembly, the controlling operations are carried out changing the laser amount until the completion of the setting of the target image forming condition many times repeatedly. For this reason, a long time is required for the control carried out for every constant use amount, and therefore, the image productivity may be reduced remarkably. According to the control of the present embodiment, the setting-operation for the image forming condition completes quickly, and the image productivity can be maintained. Moreover, the highly precise control can be carried out correspondingly to the property inherent to the laser scanner unit provided in the apparatus main assembly.

As has been described hereinbefore, in this embodiment, the image forming apparatus 1 includes the potential control means for changing both of the charge potential and the laser projection condition efficiently and maintaining the required VCONT and VBACK. In this case, the apparatus main assembly 50 recognizes the individual difference in the light emission amount of the laser scanner units using the light emission amount information written in the EPROM25 of the laser scanner unit 20, and the control value is corrected. In this manner, the control concerned can be carried out quickly, without dropping the productivity of the image forming operation, typically without using the special detecting means to sense the light emission amount of the laser scanner unit 20 in the apparatus main assembly 50, and irrespective of the individual difference of the laser scanner unit 20. More particularly, according to this embodiment, irrespective of the individual difference in the light emission amount property of the image exposure means, the setting and control of the image forming condition can be performed quickly.

In the above-described embodiment, although a description has been made about the method of specific potential control, the method for carrying out variable control of the exposure amount according to the image exposure means is applicable to the other control method. For example, the present invention is applicable also to the following potential control.

On the photosensitive drum, the portion (dark portion) which is charged by the primary charger but not exposed is formed simultaneously or sequentially using the different grid bias voltage or the different corona wire supply voltage. The surface potential of the respective dark portion is measured by the surface potential sensor, and the result thereof is sent to the control means (setting means). The control means calculates the grid bias voltage which provides the target surface potential on the basis of those results of measurements, and determines the grid bias voltage. Then, on the photosensitive drum, the portion (light portion) which is charged and exposed using the grid bias voltage determined is formed simultaneously or sequentially with the different laser projection condition. And, the surface potential of the respective light portion is measured by the surface potential sensor, and the result thereof is sent to the control means. The control means calculates the laser projection condition which provides the target VCONT on the basis of those results of measurements. In such a control, The amount of the exposure projected gradually in measuring the light portion potential can be changed to the optimal setting based on the light quantity information stored in the EPROM of the laser scanner unit.

Also, about the data stored in the EPROM of the laser scanner unit, it is not limited to the above-described example. For example, these data may be the light quantity data relative to more light emission amount set points, and more table may be prepared correspondingly to the ambient conditions. In this manner, the various substitute types are usable.

While the invention has been described with reference to the structures disclosed herein, it is not confined to the details set forth, and this application is intended to cover such modification or changes as may come within the purposes of the improvements or the scope of the following claims.

This application claims priority from Japanese Patent Application No. 044767/2007 filed Feb. 23, 2007, which is hereby incorporated by reference.

What is claimed is:

1. An image forming apparatus comprising:
an image bearing member;
a charging unit for charging said image bearing member;
an image exposure unit including a light emitting portion for emitting light to form an electrostatic image on said image bearing member charged by said charging unit, said image exposure unit being effective to control an amount of light emitted from the light emitting portion;
a developing unit including a toner carrying member for carrying toner and a bias controlling unit for applying a controlled bias voltage to the toner carrying member, said developing unit being effective to develop the electrostatic image with toner by a potential difference between the toner carrying member and the electrostatic image;
a potential difference determining unit for determining the potential difference; and a storing unit for storing a light amount control value, corresponding to the potential difference, set on a basis of a light emission amount information inherent to the light emitting portion, wherein said image exposure unit reads the light amount control value corresponding to the potential difference determined by said potential difference determining unit and controls the light amount on the basis of the light amount control value read from said storing unit.

2. An apparatus according to claim 1, wherein said potential difference determining unit determines the potential difference in response to an ambient condition of said image forming apparatus.

3. An apparatus according to claim 2, wherein said storing unit stores the light amount control value corresponding to the ambient condition.

4. An apparatus according to claim 1, further comprising a detecting unit for detecting a surface potential of said image bearing member when said image bearing member is exposed to the light on the basis of the light amount control value stored in said storing unit to control the potential difference at a target value, wherein said image exposure unit controls the light amount on the basis of a result of detection of said detecting unit so as to provide a target value of the potential difference.

5. An apparatus according to claim 1, further comprising a charged potential controlling unit controlling a charged potential of said image bearing member, and a detecting unit detecting the surface potential of said image bearing member when said image bearing member is exposed to the light on the basis of the light amount control value stored in said storing unit to control the potential difference at a target value.

6. An apparatus according to claim 1, further comprising a detecting unit for detecting a surface potential of said image bearing member when said image bearing member is exposed to the light on the basis of the light amount control value stored in said storing unit to control the potential difference at a target value, wherein the bias controlling unit controls a bias voltage applied to the toner carrying member.

* * * * *